April 7, 1959

R. KOBLER 2,881,264

DICTATION EQUIPMENT

Filed Sept. 10, 1956

INVENTOR
Richard Kobler
BY George H. Fritzinger
agt.

April 7, 1959            R. KOBLER            2,881,264
DICTATION EQUIPMENT
Filed Sept. 10, 1956            2 Sheets-Sheet 2
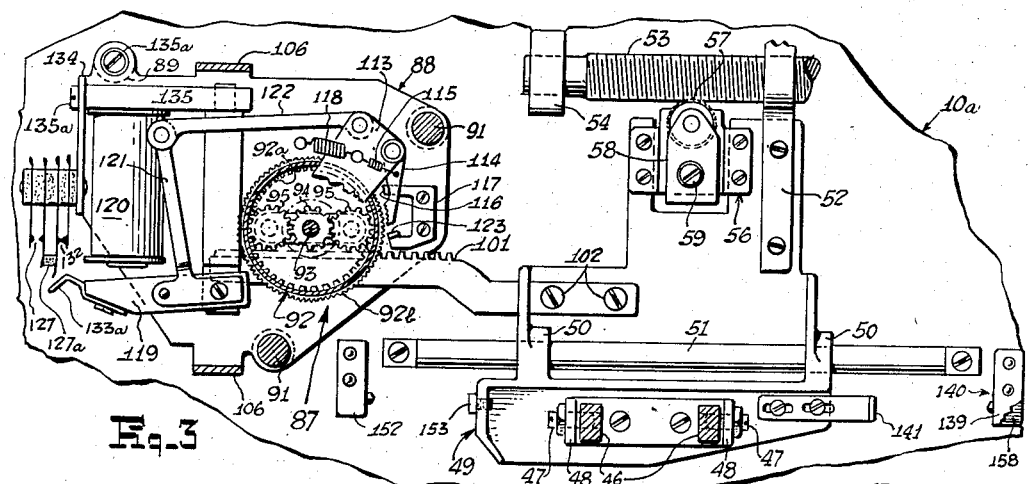
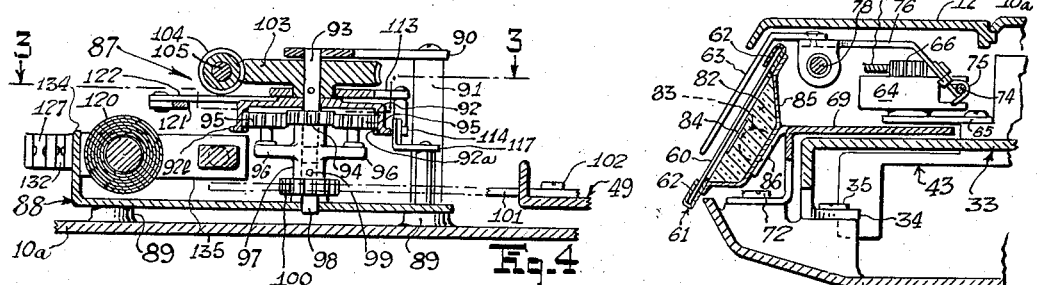
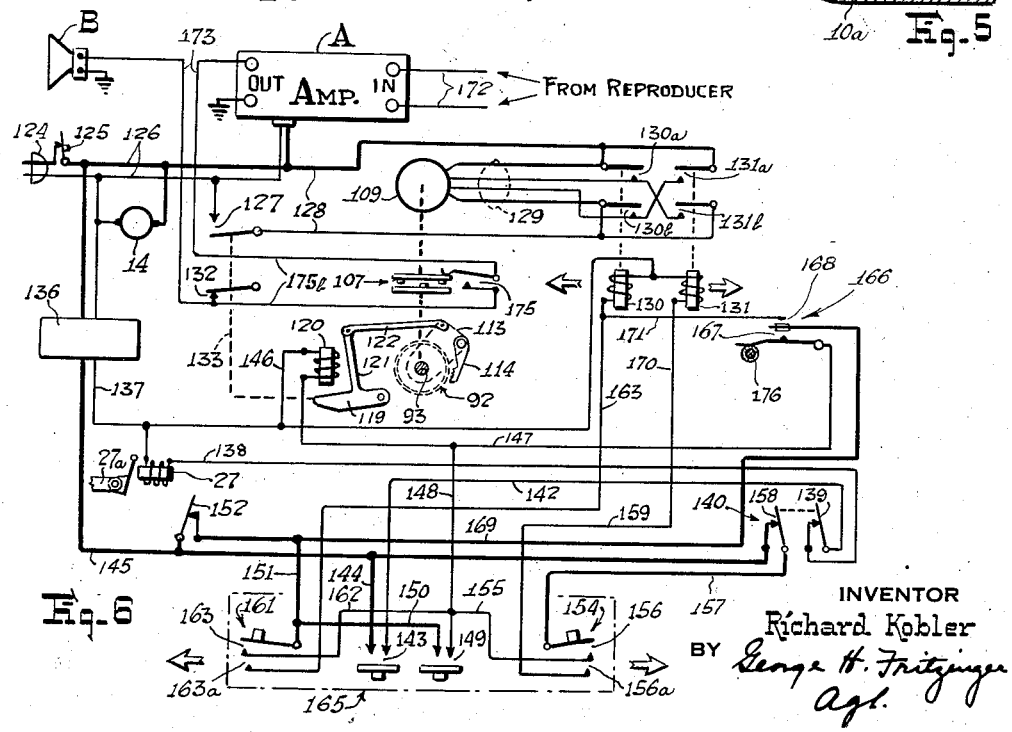
INVENTOR
Richard Kobler
BY George H. Fritzinger
Agt.

United States Patent Office 2,881,264
Patented Apr. 7, 1959

2,881,264

DICTATION EQUIPMENT

Richard Kobler, West Orange, N.J., assignor, by mesne assignments, to McGraw-Edison Company, Elgin, Ill., a corporation of Delaware Application September 10, 1956, Serial No. 608,788

13 Claims. (Cl. 179—100.4)

This invention relates to equipment for recording and transcribing dictation, and particularly it relates to special features especially useful in transcribing machines.

In dictating and transcribing machines there is a rotatable record support, a record-cooperable translating means, and a carriage movable to produce a relative traveling movement between the record support and translating means. In the operation of such machines the record is rotated and the carriage is advanced at a slow, regular speed to cause the translating means to scan a prescribed track on the record. During transcribing, as well as at times during recording, the operator will want to reproduce selected bits of the recorded dictation. This requires that the carriage be selectively advanced and backspaced to the required positions. For ease of operation and in order to save time, such movements of the carriage should be rapid, preferably continuous, and readily controlled to permit accurate selection of the bits of recorded dictation to be reproduced.

An object of the present invention is to provide a dictating and/or transcribing machine having provision for fast and accurate movement of the carriage in either direction to any desired position within its range of travel.

A further object of the invention is to provide a transcribing machine which has an improved operating mechanism and control system adapted to enable all necessary control operations to be performed readily and quickly by several manual controls remote from the machine.

A further object is to provide a control system for such machine having a start-stop control for recording and/or reproducing, a carriage backspace stepping control, sometimes referred to as a repeat control, as well as both fast-forward and fast-return controls for the carriage.

Another object is to provide the backspace stepping means as an operating part of the fast-drive mechanism for the carriage.

Another object is to disable the audio system during operation of the backspace stepping means and to reable the audio system as the fast-drive mechanism for the carriage comes into operation.

Another object is to provide for a fast automatic return of the carriage to start position as an incident to an initial act performed on the machine to change the record.

Another object is to utilize a planetary gear train in a novel and effective way to serve both as a drive transmission means for the fast carriage drive mechanism as well as a carriage backspace stepping means.

Other objects are to accomplish the aforestated objects by novel and effective mechanisms which are compact, dependable and easily operated and controlled.

These and other objects and features of the invention will be apparent from the following description and the appended claims.

In the description of my invention reference is had to the accompanying drawings, of which:

Figure 3 is a principally plan view to enlarged scale of a portion of this mechanism as seen from the line 3—3 of Figure 4;

Figure 4 is a vertical sectional view taken substantially on the line 4—4 of Figure 2;

Figure 5 is another vertical section taken substantially on the line 5—5 of Figure 2; and Figure 6 is a schematic diagram of circuits and mechanism illustrating the electrical control system of the machine.

Figure 1:
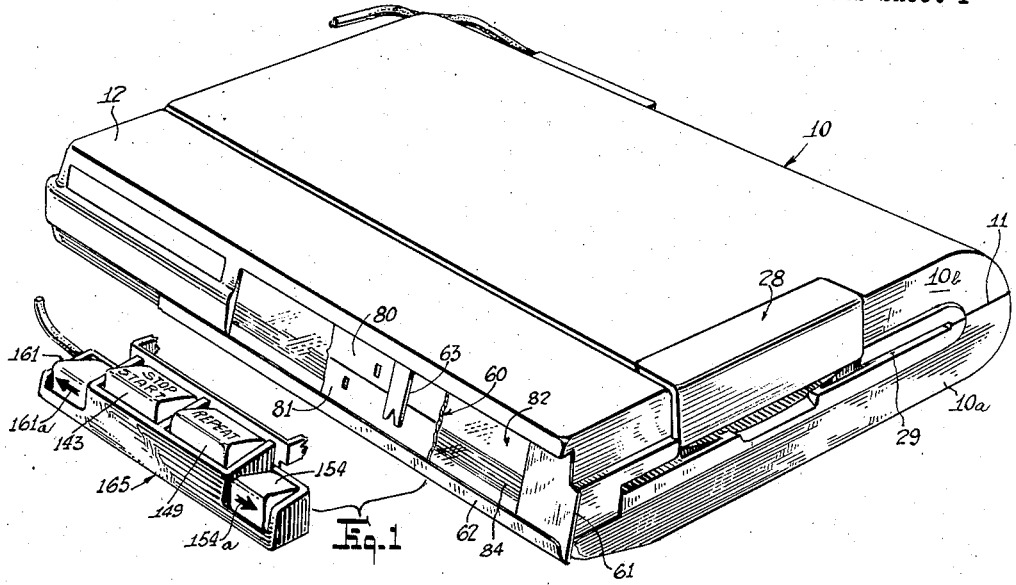
Figure 1 is a perspective view of a transcribing machine incorporating my invention, showing also in perspective a manual control device for the machine in the forefront thereof.

My invention is herein shown by way of preferred illustration in connection with a transcribing machine of the type of the dictating machine shown and described in the pending Somers application Serial No. 347,875, filed April 10, 1953, now Patent No. 2,866,647, dated December 30, 1958, to which reference may be had as to details. This machine comprises a flat, book-like housing 10 split on a medial plane 11 into lower and upper half sections 10a and 10b. These half sections are rectangular pan-like structures formed as by die casting. The lower section forms a base or frame for the operating mechanism of the machine and the upper section is primarily a cover secured as by any suitable means not shown. For decorative purposes the cover section is provided with a polished front panel 12 having certain ledges, windows, etc. along the front face which, however, need not be herein described.

The operating mechanism comprises a turntable 13 journaled at its center to the lower frame section 10a at a level about flush with the medial plane 11. This turntable is driven by a motor 14 having a drive pulley 15 coupled by a belt and friction drive train to the peripheral rim of the turntable. The drive train comprises a drive shaft 16 journaled in a housing 17 fractionally shown and having a pulley 18 indicated by dash-dot lines in Figure 2, which is coupled by a belt 19 to the motor drive pulley 15. The housing 17 has a side opening exposing the drive shaft 16 for engagement with an intermediate friction wheel 20 of the aforementioned friction drive train. This wheel is journaled to a link 21 pivoted at 22 to a bell crank lever 23 itself pivoted on a post 24 upstanding from the frame section 10a. The link 21 is urged by a tension spring 25 to press the intermediate wheel against the turntable and against a brake shoe 26 on the frame section 10a. By means of a start-stop electromagnet 27 shown in Figure 6, which is coupled by a link 27a to the bell crank lever 23, the friction wheel 20 can be drawn away from the brake shoe and into engagement with the drive shaft 16 to start rotation of the turntable. When the bell crank lever is next released, the friction wheel is returned into engagement with the brake shoe to bring the turntable to a quick stop.

At the right side of the machine there is a hinged cover section 28 which can be raised into an open position to provide space for the fingers in mounting and removing a disk record onto and from the turntable through a slot 29 in the housing at the medial plane 11. When a disk record is inserted fully into the slot and the cover section 28 is closed, a record centering and clamping mechanism is operated to secure the record to the turntable. This centering and clamping mechanism comprises a frusto-conical clamping member 30 mounted on a stub shaft 31 which is journaled in a bearing 32 axially aligned with the turntable and provided on a bridge 33 extending diametrically across the turntable. This bridge has a pair of laterally-extending lugs 34 at each end (those at the rearward end being shown in Figure 2 and one at the forward end in Figure 5) which are secured by screws 35 to ledges or bosses upstanding from the bottom of the frame section 10a. The clamping member is suitably biased downwardly into a record-clamping position but is shiftable upwardly into a disengaged position by a U-lever 36 pivoted at 37 to the bridge 33 and having a forked extension 38 riveted thereto and embracing the clamping member, the forked extension having pins 39 in positions diametrically opposite the clamping member which engage a peripheral slot therein. When the cover section 28 is opened an arm thereon (not shown) swings downwardly against a roller 36a on the outer end of the U-lever to disengage the clamp in the manner disclosed in the pending Dietz application Serial No. 320,025, filed November 12, 1952. When the cover section 28 is next closed, this arm is released from the roller to allow reengagement of the record clamp responsive to its bias spring.

Cooperable with a mounted disk record on the turntable is a reproducer-type translating device 40 which may, for example, be of the type having a stylus 41 adapted to engage the track of an embossed record. This translating device is universally pivotally connected at 42 to a carriage 43 overlying the lefthand portion of the turntable. When the record clamp is disengaged by the opening of the cover section 28, an arm 38a on the forked extension 38 is raised to lift a transverse rod 176 to disengage the reproducer 40 from the record. The rod 176 is carried by two parallel arms 177 and 178 secured to a shaft 179 journaled in the bridge 33. As this rod is raised, it lifts upwardly against the outer end of a lever 180 pivoted at 181 to the right wall of the carriage 43 and having a side lug 182 at an intermediate portion thereof operable against a lateral lift pin 183 on the reproducer to raise the same from the record. Thus, the opening of the cover section 28 not only disengages the record clamp from the record but also lifts the reproducer to free the record for its removal from the machine as well as to provide free space across the turntable for mounting of a new record.

The carriage 43 is a hollow, rectangular structure supported at its rearward end by a roller 44 journaled thereon and riding on a bar 45 secured to and extending leftwardly from the bridge 33. The carriage is supported at its forward end by two depending legs 46 connected by trunnions 47 to upright apertured legs 48 of a bracket secured to a subcarriage 49 as shown in Figure 3. This subcarriage has two laterally-spaced bearings 50 at its forward end which slidably embrace a support rod 51 mounted at its ends on the frame section 10a. The subcarriage has a rearwardly-extending bracket 52 only fractionally shown but which is suitably shaped to slidably embrace a second support rod also not shown. By this mounting means the carriage is free to move laterally to carry the reproducer-translating device 40 along a radial line of the turntable.

Progressive movement of the carriage during rotation of the turntable is provided by a feed screw 53 journaled in bearings on the frame section 10a, one of which is indicated at 54. This feed screw is coupled by worm gearing 55 to a depending mounting shaft of the turntable. Journaled on a bracket plate 56 mounted on the rearward portion of the subcarriage is a circular feed nut 57 engaging the feed screw as shown in Figure 3. This feed nut is frictionally held by a desired restraint against turning by means of a clamp 58 adjustable to the desired pressure against the end of the feed screw by a screw 59. The adjustment of the feed screw is such that the feed nut will not be turned by driving forces received from the feed screw but such that the carriage can be moved at any time by other means imparting a force thereto sufficient to overcome the frictional restraint on the feed nut. Thus, in response to a rotation of the turntable the reproducer stylus 41 will scan a helical track on the record. By such scanning movement the reproducer will pick up the recorded signal and feed sound-representing oscillations into an audio amplifier A having output connections to a receiver or speaker B as indicated in Figure 6.

Figure 2:
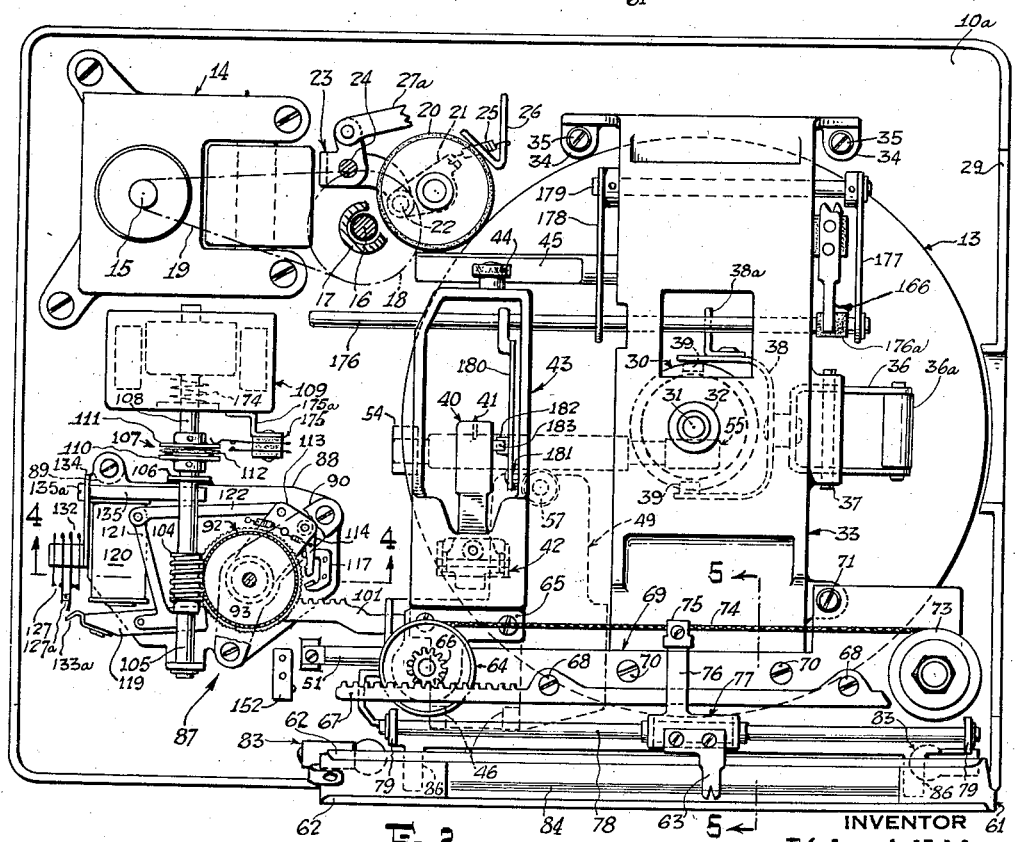
Figure 2 is a plan view of the operating mechanism of the machine as seen with the top housing section removed and with several of the parts appearing in section.

When a transcriber reproduces recorded dictation from a record, it is first necessary to check the start and end points of each item of dictation to enable proper set-up and spacing of the typewritten material on each sheet, and it is necessary further to check each point where a correction or other directive remark has been made to know in advance the necessary information for handling that correction or directive remark and permit a finished copy to be made in one operation. Such length and correction marks are provided preferably on an index slip 60 which is mounted slidably in a bracket 61 having opposite overhanging edges 62 for receiving the opposite edges of the slip. A positioning of the reproducer 40 on the disk record in correspondence with the positions indicated on the index slip is done by moving the carriage until a pointer 63 comes into registration with the respective marks. The pointer is coupled to the carriage by a mechanism comprising a drum 64 journaled on an index bracket plate 65 secured by screws to the forward part of the carriage 43 as shown in Figure 2. This drum has a pinion gear 66 which meshes with a stationary rack 67 secured by screws 68 to a stationary index frame plate 69. This frame plate is secured to the front part of the bridge 33 by two screws 70 and to a side lug of the bridge by a screw 71, and it has also a supporting leg secured to a boss on the frame section 10a by a screw 72 as shown in Figure 5. Journaled on the right end portion of this frame plate is a second drum 73. A cord 74 is secured to and trained around each of these drums and led from one to the other, and is held under constant tension by a torsion spring (not shown) acting on the second drum 73. Secured by a clamp 75 to the cord is an arm 76 of a small carriage 77 for the pointer 63. This carriage is in the form of a U-bracket having depending apertured lugs slidably embracing a support rod 78 carried at its ends by turned-up lugs 79 on the index frame plate. As the main carriage 43 is advanced to the right, the cord is unreeled from the drum 64 with an amplified motion and is taken up by the drum 73 to impart an amplified movement to the pointer 63; and when the carriage is backspaced to the left, the drum 64 takes up the cord from the other drum to shift the pointer leftwardly with an amplified corersponding movement.

Preferably, the index marks are made by punching holes through the slip 60 as described in the pending LaForest application Serial No. 543,210 filed October 27, 1955. The holes are punched at an upper level 80 to indicate length marks and at a lower level 81 to indicate correction marks (Figure 1). In order that a transcriber may readily distinguish between length and correction marks other than by level, a red background is provided for the correction marks in a novel manner comprising a bar 82 of Lucite (methyl methacrylate) at the back of the mounted slip. This Lucite bar is illuminated at its ends by light bulbs 83 and is provided with a red layer 84 of Lucite at the level 81 of the correction marks. The Lucite bar is supported by a channel frame 85 secured as by spot welding to lugs 86 struck forwardly from the index frame plate 69.

The initial exploratory operations of the transcriber in checking the length and correction marks requires considerable "skipping" of the carriage in both forward and backward directions to the desired positions. It is highly desirable that the transcriber be able to skip the carriage quickly and accurately by remote control—i.e., by readily-operable pushbuttons provided within easy reach of her typewriter. Also, there should be provided the usual step-by-step backspacing means for the carriage to enable the transcriber to repeat any last portion of the recordation which may not have been clearly understood in the first instance. By my invention there is provided a novel carriage drive means under remote control of the transcriber for moving the carriage continuously in either direction at fast speed to any desired point or for effecting step-by-step backspacing of the carriage.

The carriage drive means comprises a planetary gear train 87 journaled between a lower frame plate 88 mounted on bosses 89 provided on the frame section 10a, and an upper horizontal frame bar 90 having the outline as shown by dash-dot lines in Figure 2 and supported at its ends on two posts 91 upstanding from the lower frame plate. The gear train comprises a disk 92 having a depending rim flange provided with an internal gear 92a. This disk is journaled on a shaft 93 which is itself journaled at its upper end in the frame bar 90 and is journaled at its lower end in another component of the gear train, as will appear. Secured to the shaft 93 and disposed within the flanged disk 92 is a small pinion gear 94. Between this pinion gear and the internal gear 92a there are two revolving gears 95 at diametrically opposite sides of the pinion gear. These revolving gears are journaled on respective cross arms 96 having a hub 97 provided with an axial bore into the upper portion of which is journaled the lower end of the shaft 93. Extending through the remaining portion of the axial bore and through a short distance therebelow is a shaft 98 secured to the hub by a pin 99. The lower end of this shaft is journaled in the lower frame plate 88. The hub 97 is provided with a pinion gear 100 at its lower portion. This pinion gear engages at the front side of the machine a transverse rack 101 extending leftwardly from the sub-carriage 49 and secured thereto by screws 102. Rotation of the hub 97 in clockwise and counterclockwise directions will therefore produce backward and forward movements respectively of the carriage. Such movement of the carriage will occur in response to any driving force on the hub sufficient to overpower the frictional restraint on the feed nut 57.

On the shaft 93 between the flanged disk 92 and frame bar 90 there is secured a gear 103 which meshes with a worm 104 provided on a front-to-back-extending shaft 105 journaled at its ends in apertured arms 106 upstanding from the lower frame plate 88. This shaft has an axially yieldable coupling 107 with a coaxial drive shaft 108 of a four-pole reversible motor 109. The coupling 107 may be of a usual type comprising two spaced disks 110 and 111 on the respective shafts 105 and 108 having drive pins extending from their confronting sides towards each other but through distances short of the spacing therebetween, which pins extend alternately from the two plates at regular intervals and engage an apertured intervening disk 112. Because the shaft 93 is coupled to the motor through a worm gear, the shaft is held locked except when turned by the motor. Any step rotation of the flanged disk 92 in a clockwise direction while the motor is at standstill will therefore produce a step-by-step backspacing of the carriage. Alternatively, any rotation of the shaft 93 by the motor 109 in clockwise and counterclockwise directions while the flanged disk is held stationary will cause a corresponding rotation of the hub 97 through the pinion gear 94 and revolving gears 95 to produce a continuous movement of the carriage respectively in forward and backward directions. This movement of the carriage is caused to be at a fast speed by suitable selection of the motor speed and gear ratios. In accordance with my invention, I employ a single backspacing latch mechanism which when actuated first moves the flanged disk 92 by one step and then latches the same. Thus, upon repeatedly actuating the backspace-latch mechanism the carriage is backspaced by successive steps, but upon retaining this mechanism in an actuated position and then starting the motor 109 the carriage is driven at a fast speed. Suitable means are provided to control the direction of rotation of the motor so that the operator can readily select whether to advance or backspace the carriage at the fast speed, as will appear.

The backspace-latch mechanism above referred to comprises a reciprocable arm 113 pivoted on the hub of the worm gear 103. Pivoted to the outer end of this arm is a pawl 114 engageable with a finely-toothed external gear 92b provided on the flanged disk 92. The pawl is biased to engage the gear 92b by a tension spring 115 but is held normally out of engagement by a finger 116 on a bracket 117 as indicated in Figure 3. Also, the arm 113 is biased counterclockwise to an unoperated position by a tension spring 118. This unoperated position of the arm is defined by a coupling of the arm with the armature 119 of a backspacing electromagnet 120 through an arm 121 pinned to this armature and a link 122 pivotally interconnecting the arm 121 and the arm 113. When the arm 113 is actuated clockwise by energization of the electromagnet 120 the pawl rides off the finger 116 into engagement with the gear 92b and turns the gear clockwise to backspace the carriage by a small step, and at the end of the actuating stroke the nose of the pawl 114 becomes wedged between the gear 92b and a cam 123 on the bracket 117 to lock the disk 92 securely against rotation in either direction. Energization of the drive motor 109 will then produce a fast movement of the carriage.

As shown in Figure 6, the machine receives its operating power through a plug 124 adapted to be connected to a 110-volt A.C. line not shown. This plug is connected through a master switch 125 and power line 126 to the amplifier A and to the regular drive motor 14, and it is also connected through the power line 126, a switch 127 and a line 128 to the reversible drive motor 109 for the carriage. This reversible drive motor has four input leads comprised in a cable 129 which are differently connectable by two direction control relays 130 and 131 to control the direction of rotation of the motor. Each of these relays includes two single-throw switches referred to by the number of the relay with the suffix letters a and b. When the relays are not energized the switches are opened, with the result that the two center wires of the cable 129 are opened and the motor will not run. When the relay 130 is energized, the two outside leads of the cable 129 are connected parallel with the respectively adjacent inside leads to cause the motor to turn to backspace the carriage, and when the relay 131 is energized each of the outside leads of the cable 129 is connected to the inside lead respectively adjacent the other outside lead to cause the motor to turn in a direction to advance the carriage. The switch 127 is controlled with a second switch 132 by the backspacing electromagnet 120 as indicated by the tie line 133 in Figure 6. As shown in Figures 3 and 4, the switches 127 and 132 are mounted in an insulating stack supported on the outer side of a flange 134 turned up from the frame plate 88, and the electromagnet 120 has a base 135 secured by a screw 135a to the other side of this flange. The operative connection between the armature 119 and these switches, as indicated diagrammatically by the tie line 133 in Figure 6, comprises a cam 133a on the armature 119 which is moved against one member of the switch 132 to open this member as the armature is actuated. By means of an insulating bridge 127a between the switch 132 and the switch 127 the latter is at the same time closed. From the foregoing description it is apparent that the backspacing electromagnet 120 and one or another of the direction control relays 130 and 131 must be energized to cause the carriage drive motor 109 to run.

The control circuits for the machine, which are also shown in Figure 6, are energized from a converter 136 connected across the power line 126. This converter provides low-voltage D.C. power for operating the start-stop electromagnet 27, the backspacing electromagnet 120 and the direction control relays 130 and 131. The circuit for the start-stop electromagnet is completed through a line 137, the coil of this electromagnet, line 138, normally-closed switch section 139 of a dual end switch 140 of a pushbutton type operable into open position by an adjustable arm 141 on the carriage when the carriage reaches the end of its forward travel (Figure 3), a lead 142, a push-type start-stop switch 143, and leads 144 and 145. Thus, except when the carriage is in its extreme forward position, the closing of the start-stop switch 143 will energize the electromagnet 27 to start the drive mechanism of the machine.

Operation of the backspacing electromagnet 120 alone is effected by a circuit leading from the converter 136 through the lead 137, lead 146, coil of the electromagnet 120, lead 147, lead 148, push-type backspacing switch 149, leads 150 and 151, normally-closed end switch 152 of a pushbutton type (Figure 3) operable by an adjustable screw 153 on the carriage when the carriage reaches the end of its backward travel, and the lead 145. Thus, except when the carriage is at the extreme end of its backward travel, pressing the push-button switch 149 will cause the carriage to be backspaced by one step.

The means for skipping or fast-driving the carriage in a forward direction is controlled by a pushbutton switch 154 of the dual make-make type. When this switch is depressed, the circuit for the backspacing electromagnet is completed from the lead 148 aforementioned onwardly through a lead 155, upper section 156 of the make-make switch 154, lead 157, second switch section 158 of the forward end switch 140 and lead 145 aforementioned. Operation of this electromagnet closes the motor switch 127 to prepare the circuit of the drive motor 109 for operation. Immediately following activation of the electromagnet 120 as the switch 154 is operated, the circuit is completed for the forward direction relay 131 through the lead 137, coil of the relay 131, lead 159, second switch 156a of the make-make switch 154, first switch 156 of this make-make switch, lead 157, end switch section 158, and lead 145. Operation of the switch 154 therefore causes an initial backspacing of the carriage by one step due to the initial operation of the electromagnet 120 and immediately thereafter it causes the fast forward drive of the carriage to start, which will continue so long as the switch 154 is held operated.

The means for skipping or fast-driving the carriage in a backward direction is controlled by a push-button switch 161 also of the dual make-make type. When this switch is depressed, the circuit for the backspacing electromagnet is completed from the lead 148 aforementioned onwardly through a lead 162, upper section 163 of the make-make switch 161, lead 151, rearward end switch 152 and lead 145 aforementioned. Operation of this electromagnet closes the motor switch 127 to prepare the circuit of the drive motor 109 for operation, the same as when the fast-forward control switch 154 is closed. Immediately following activation of the electromagnet 120 as the fast-rearward switch 161 is operated, the circuit is completed for the backward direction relay 130 through the lead 137, coil of this relay 130, lead 163, second switch 163a of the make-make switch 161, first switch 163 of this same switch 161, lead 151, end switch 152 and the lead 145. Operation of the switch 161 therefore causes an initial backspacing by one step of the carriage due to the initial operation of the electromagnet 120, and immediately thereafter it starts the fast backward drive of the carriage, which continues until the switch 161 is next released.

The pushbutton control switches for the machine are conveniently arranged in line with each other in a housing 165, as shown in Figure 1. This housing may have separate compartments for the individual switches with each compartment closed at the top by the pushbutton of the respective switch, and the pushbutton may be hinged at the back side of the housing in the usual way. Preferably the fast-drive switches 161 and 154 are provided at the ends of the housing with the buttons exposed not only at the top but also at the front, and printed on the front of the buttons are arrows 161a and 154a indicating the respective directions of movement of the carriage which will occur when these fast-control buttons are pressed. The regular control switches—which are the start-stop switch 143 and the repeat backspacing switch 149—are preferably located at a higher level, as shown, to facilitate the more common operation of these switches.

The present machine is also adapted to cause the carriage to be backspaced quickly to its initial starting position whenever the cover section 28 is opened to replace a record on the turntable. For this purpose there is provided a dual switch 166 of the make-make type having normally-open lower and upper switches 167 and 168 (see Figure 6) which are operated into closed positions in sequence by the rod 176 through an insulating sleeve 176a thereon as the cover section is opened. The closing of the switch 167 completes the circuit for the backspacing electromagnet 120 through the leads 137, coil of this electromagnet, the lead 147, switch 167, the lead 169, end switch 152 and lead 145. The immediate successive closing of the switch 168 completes the circuit for the backward direction relay 130 through the lead 137, the coil of this relay, lead 171, the switch 168, the lead 169, end switch 152 and lead 145. Thus the backspacing electromagnet 120 and the backward direction relay 130 are operated in succession to start the motor 109 in the reverse direction to return the carriage at a fast rate until the end switch 152 is opened by the carriage reaching its start position.

As shown in Figure 6, the input of the amplifier A is connected by leads 172 (fractionally shown) to the reproducing head 40 and the output circuit is connected by a lead 173 through the aforementioned switch 132 to the speaker B, only a single line connection being here shown since the other side of the output circuit is indicated at the amplifier and speaker as being grounded. Since the switch 132 is opened when the back-spacing electromagnet 120 is operated, the audio system is disabled during each backspacing step of the carriage. This is done to prevent click sounds from being produced by the speaker during the backspacing operations. However, when the carriage is being skipped at a fast speed to any desired point it is advantageous for the operator to have sounds produced by the speaker due to the dragging of the stylus across the grooves, particularly when the carriage is being moved to the beginning or the end of a recordation on the record, because then the operator can judge by the cessation of such sound when the end point is reached. The audi system is therefore re-abled automatically by my invention when the fast carriage drive system is in operation. This is accomplished by employing a novel feature of the motor 109 which causes its rotor to be shifted axially against the force of a compression spring 174 whenever the motor is energized, such shifting of the rotor being permitted by my invention in view of the loose coupling 107 between the motor shaft 108 and the shaft 105 hereinbefore described. By this shifting of the rotor, a switch 175 which is normally held open is released to closed position. This switch comprises two switch members mounted in an insulating stack supported by a bracket 175a on the motor. The switch has one switch member slidably engaging the disk 111 on the drive shaft of the motor, as indicated in Figure 2. Axial movement of the rotor against the force of the compression spring 174 as the motor starts to run releases the switch 175 to close with its other contact. The switch is connected in parallel with the switch 132 by leads 175b, as shown in Figure 6. Accordingly, although the switch 132 is initially opened whenever the fast carriage drive mechanism is started, the immediate successive closing of the switch 175 serves to complete the output circuit of the amplifier to the speaker so that the audio system is operative during the actual fast movement of the carriage.

The particular embodiment of my invention herein particularly shown and described is intended to be illustrative and not necessarily limitative of my invention since the same is subject to changes and modifications without departure from the scope of my invention, which I endeavor to express according to the following claims.

I claim:

1. In a dictating machine including a rotatable support for a record, record-cooperable translating means and a movable carriage for providing a relative traveling movement between said record support and translating means: the combination of a first drive mechanism including a drive motor coupled to said support and carriage for rotating the support and concurrently progressively advancing the carriage at normal speed to cause the translating means to scan a sound track on the record; a second independent drive mechanism including a second drive motor and means for coupling said second drive motor to said carriage for selectively advancing and backspacing said carriage at a fast speed; a start-stop control for said first drive mechanism; forward and backward start-stop controls for said second drive mechanism and means controlled respectively by said forward and backward start-stop controls and operable independently of whether the first drive mechanism is in operation for fast-driving said carriage in either direction at any time.

2. The combination set forth in claim 1 wherein said second drive mechanism is in a normally uncoupled condition, including means for backspacing said carriage by one step and for coupling said second drive mechanism in sequence.

3. In a dictating machine including a rotatable support for a record, record-cooperable translating means and a movable carriage for providing a relative traveling movement between said record support and translating means: the combination of a first drive mechanism including a drive motor coupled to said support and carriage for rotating the support and concurrently progressively advancing the carriage at normal speed to cause the translating means to scan a sound track on the record; a second independent drive mechanism including a second drive motor and means for coupling said second drive motor to said carriage for selectively advancing and backspacing said carriage at a fast speed; an audio system for said dictating machine including a receiver and microphone transducer means, and an amplifier for amplifying sound-representing oscillations fed between said translating and transducer means; repeatedly-operable means in said second drive mechanism for coupling the drive mechanism and backspacing said carriage by successive steps; means for disabling said audio system when said carriage is backspaced by said repeatedly-operable means; and means for restoring said audio system to operative condition when said carriage is driven by said second drive mechanism.

4. In a dictating machine including a rotatable support for a record, record-cooperable translating means and a movable carriage for providing a relative traveling movement between said record support and translating means: the combination of a fast-drive mechanism for said carriage comprising a drive motor and a drive transmission normally in an uncoupled state and engageable to couple the motor to the carriage; operable means for backspacing said carriage by one step each time said drive transmission is engaged; and a separately-operable means for concurrently engaging said drive transmission and starting said drive motor to cause the carriage to be driven at a fast speed.

5. The combination set forth in claim 4 including a receiver-microphone transducer means; an audio system for interconnecting said transducer and translating means; means responsive to operation of said backspacing means for disabling said audio system; and means responsive to operation of said separately-operable means for restoring said audio system to operative condition while said carriage is being driven at a fast speed.

6. In a dictating machine including a rotatable support for a record, record-cooperable translating means and a movable carriage for providing a relative traveling movement between said record support and translating means: the combination of a fast-drive mechanism for said carriage comprising a drive motor and means for coupling said motor to said carriage, said motor having an axially-displaceable rotor biased out of alignment with its cooperating stator and propelled electromagnetically into alignment therewith when the motor is energized; means comprising a control switch for said dictating machine for effecting a conditioning operation on the machine when the carriage is fast-driven; and means for operating said control switch by the axial shifting of said rotor into alignment with said stator as the motor is started.

7. In a dictating machine including a rotatable support for a record, record-cooperable translating means and a movable carriage for providing a relative traveling movement between said record support and translating means: the combination of means repeatedly operable to backspace said carriage by successive steps; a drive motor for moving said carriage continuously at a fast speed; means for coupling said motor to said carriage by operation of said backspacing means; and control means including a manual control member actuatable to cause said backspacing means and said motor to be energized in the sequence here named.

8. In a dictating machine including a rotatable support for a record, record-cooperable translating means and a movable carriage for providing a relative traveling movement between said record support and translating means: the combination of means repeatedly operable to backspace said carriage by successive steps; a drive motor for moving said carriage continuously at a fast speed; means for coupling said motor to said carriage by operation of said backspacing means, said motor being of a reversible type having forward and reverse control circuits; and control means including fast-reverse and fast-forward control switches for said carriage, means responsive to operation of said fast-reverse control switch for operating said backspacing means, closing said reverse control circuit and starting said motor, and means responsive to operation of said fast-forward control switch for operating said backspacing means, closing said forward control circuit and starting said motor.

9. The combination set forth in claim 8 including forward and reverse end switches respectively operable by said carriage to stop the same when the carriage reaches the forward and reverse ends of its travel.

10. In a dictating machine including a rotatable support for a record, record-cooperable translating means and a movable carriage for providing a relative traveling movement between said record support and translating means: the combination of a drive and backspacing mechanism for said carriage comprising a planetary gear train having coaxial gears, a support member journaled at the axis of said gears and a revolving intermediate gear meshing with said coaxial gears and journaled on said support member; a drive motor; means for driving one of said coaxial gears by said motor and for holding the same stationary when the motor is not running; means coupling said support member to said carriage to cause the carriage to be driven when the support member is turned; means operable to latch the other of said coaxial gears whereby driving forces imparted to said one coaxial gear will cause revolvement of said intermediate gear to drive said carriage; and means associated with said latch means for moving said other coaxial gear by an increment to cause said carriage to be backspaced by one step each time said latch means is operated.

11. The combination set forth in claim 10 including an electromagnet for operating said latching means; a power supply circuit for said drive motor; and switch means in said power circuit operable by said electromagnet as said latching means is operated.

12. The combination set forth in claim 11 including an audio circuit for said dictating machine; means for disabling said audio circuit as said latch means is operated; and means for re-abling said audio circuit when said drive motor is started.

13. In a dictating machine including a rotatable support for a record, record co-operable translating means and a movable carriage for providing a relative traveling movement between said record support and translating means: the combination of a feed screw; a circular feed nut frictionally rotatably mounted on said carriage and continuously engaging said feed screw for causing said carriage to be driven as the feed screw is turned; a first drive motor for rotating said support and feed screw to cause said translating means to scan a progressive sound track on the record; a fast drive mechanism for said carriage including a second motor and a coupling between said second motor and said carriage including a rack on the carriage, a pinion engaging said rack and a normally disengaged clutch between the motor and said pinion; a start-stop control for said first drive motor; and forward and backward start-stop controls for said carriage drive mechanism including means for engaging said clutch when either control is shifted to start position to drive the carriage in the respective direction at a fast speed against the frictional restraint of said circular feed nut.

References Cited in the file of this patent

UNITED STATES PATENTS 2,375,525    Clausen _____ May 8, 1945